No. 735,221.

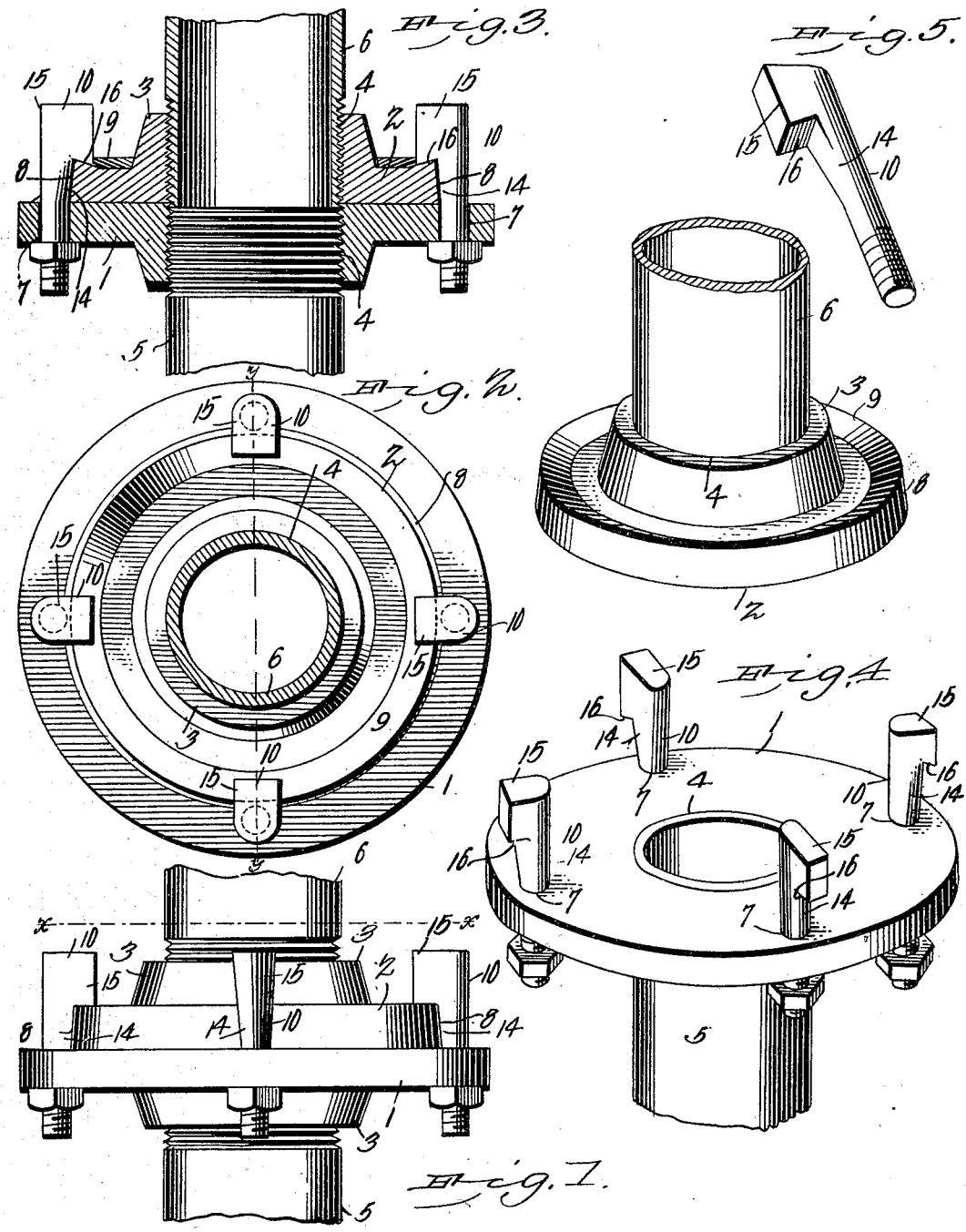

Patented August 4, 1903.

UNITED STATES PATENT OFFICE.

WILLIAM NELSON DUFFORD, OF FINDLAY, OHIO.

FLANGE-UNION.

SPECIFICATION forming part of Letters Patent No. 735,221, dated August 4, 1903.

Application filed June 18, 1902. Serial No. 112,216. (No model.)

*To all whom it may concern:*

Be it known that I, WILLIAM NELSON DUFFORD, a citizen of the United States, residing at Findlay, in the county of Hancock and State of Ohio, have invented a new and useful Flange-Union, of which the following is a specification.

This invention relates to that class of devices which are known as "flange-unions" and which are used especially for connecting the meeting ends of pipes in such a manner that they may be swiftly and accurately disconnected or joined together, as occasion may require. For this purpose numerous devices have heretofore been employed, most of them embodying flanges or disks having screw-threaded collars to receive the ends of the pipes, the said flanges or disks being afterward connected securely together by means of bolts or suitable fastening means. Such devices as heretofore constructed have, however, been objectionable in that when the devices have been disconnected and it has been afterward attempted to reunite them it has been found difficult to obtain an exact registration of the parts, an objection which when it is remembered that these operations are sometimes performed under circumstances of some difficulty is of no little importance. My present aim and object is to provide a device of this class by the use of which the meeting ends of pipes may be very easily and quickly separated and which shall enable the parts when it shall be desired to put them together again to be properly adjusted almost instantaneously without having to hunt for the bolt-holes and without possibility of not getting the parts into proper registration with each other.

With these ends in view the invention consists in the improved construction, arrangement, and combination of parts, which will be hereinafter fully described, and particularly pointed out in the claim.

In the accompanying drawings, Figure 1 is a side view showing the meeting ends of two pipes connected by my improved flange-union. Fig. 2 is a view taken sectionally through one of the pipes on the line $x$ $x$ in Fig. 1 and showing the flange-union in elevation. Fig. 3 is a longitudinal sectional view taken on the line $y$ $y$ in Fig. 2. Fig. 4 is a perspective view showing the meeting ends of two pipes about to be connected by my improved flange-union. Fig. 5 is a detail view of one of the connecting-pins detached.

Corresponding parts in the several figures are indicated by like characters of reference.

My improved flange-union comprises in its construction two disks 1 and 2, each provided on its outer side with a collar 3, surrounding a central perforation 4, made of varying diameter, so as to fit various sizes of pipes. The opening 4 and the collar adjacent thereto of each disk is internally screw-threaded to receive the correspondingly-threaded ends of the pipes 5 and 6, which are to be connected thereby.

The disk 1 is made sufficiently larger than the disk 2 to have openings 7 formed therein for the reception of the connecting devices, said openings being formed closely contiguous to the edge of the disk 2 when the latter is in position. The said disk 2 is beveled upon its outer side or face from its edge in a downward direction toward the collar 3, the said bevel being indicated by 8 in the drawings. The edge 9 of the said disk 2 is also slightly tapered from the edge of its inner face in an outward direction. In other words, the diameter of the inner face of said disk is slightly greater than the diameter of its outer face. This construction will be readily understood when reference is had to Fig. 3 of the drawings.

The connecting means whereby the two disks are united consists of pins 10, engaging the openings 7, of which there may be any desired number — usually four — the said openings being located equidistantly apart. The outer ends of the pins 10 are screw-threaded, as shown at 11, to receive the clamping-nuts 12. The body 13 of each pin is made of a diameter which shall cause it to fit snugly in its receiving-hole, not so tightly, however, but what it may be drawn through said hole in the act of clamping or tightening the parts together. Near its upper end the connecting-pin 10 is made slightly beveled or tapering, so as to fit snugly against the tapering on one side edge 9 of the disk 2. Above the said tapering portion 14 each pin is provided with a lateral extension forming a hook or head 15, the under side or edge of which is undercut or beveled, as shown at 16, to engage the bevel 8 of the disk 2 when the parts are placed together.

In operation the disks or members of the coupling are adjusted upon the meeting ends of the pipes to be united by their central screw-threaded openings. The pins 10 are placed in the perforations 7, with which they are permanently connected by means of the nuts 12 upon their outer screw-threaded ends. By "permanent" is meant that when once in position the said pins do not require to be again removed for the purpose of disconnecting or reuniting the pipes. All that now remains is to turn the heads 15 of the pins 10 outwardly, so as to permit the meeting faces of the disks 1 and 2 to be placed in contact with each other, which may be easily done, inasmuch as the pins by their beveled portions 14 will be retained with their hooked ends extending outward in the position shown in Fig. 4. The pins 10 are now turned until their undercut heads 15 extend over the beveled side of the disk 2, when by tightening the nuts the parts will be firmly clamped together and united, the beveled portions of the pins or bolts lying snugly against the adjacent beveled edge 8 of the disk 2. To disconnect, it is only necessary to slightly loosen the clamping-nuts, when by giving the pins a half-turn the parts may be immediately separated.

The important utility of my invention lies in the fact that by the use thereof the parts to be connected may be united with greater facility than with other devices of this kind as heretofore constructed. This is of the utmost importance when the circumstances under which devices of this kind are usually employed are taken into consideration. Oil-well machinery, for instance, where flange-unions of this kind are frequently employed for connecting the pipes, often requires to be taken down and reërected at some other place. This involves the temporary separation of the pipes, and as this work must often be performed hurriedly and frequently in the dark it is of the utmost importance that means should be at hand whereby said work may be performed not only swiftly, but accurately. Now it will be seen, first, that in order to disconnect the parts it is only necessary to loosen the nuts upon the connecting-pins sufficiently to permit the undercut heads of said pins to be disengaged from the beveled face of the disk 2; secondly, that the tapering portions 14 of the said connecting-pins, which lie contiguous to the beveled edge 9 of the disk 2, prevent the said pins from being withdrawn through or rattling in the perforations 7, where, on the contrary, they will become lightly wedged, so that when the time comes to unite the parts the pin-heads will not swing around and obstruct the placing together of the meeting faces of the disks 1 and 2. These features of my invention are of great importance and will readily commend themselves to the practical artisan familiar with this class of work.

Having thus described my invention, I claim and desire to secure by Letters Patent of the United States—

In a device of the class described, the combination of a disk having pin-holes formed therein, a disk fitting between said pin-holes and having its edge tapered outwardly, connecting-pins seated in the said pin-holes and having tapered portions engaging the tapered edge of the disk and heads engaging the outer face of the disk, and nuts upon the outer screw-threaded ends of said pins whereby the parts may be drawn together.

In testimony that I claim the foregoing as my own I have hereto affixed my signature in the presence of two witnesses.

WILLIAM NELSON DUFFORD.

Witnesses:
J. M. PLATT,
GEO. W. STEPHENS.